(12) United States Patent
Sotowa et al.

(10) Patent No.: US 9,196,899 B2
(45) Date of Patent: Nov. 24, 2015

(54) ANODE ACTIVE MATERIAL FOR USE IN LITHIUM SECONDARY BATTERY

(75) Inventors: Chiaki Sotowa, Minato-ku (JP); Takahiro Tamura, Minato-ku (JP)

(73) Assignee: SHOWA DENKO K.K., Tokyo (JP)

( * ) Notice: Subject to any disclaimer, the term of this patent is extended or adjusted under 35 U.S.C. 154(b) by 350 days.

(21) Appl. No.: 13/814,097

(22) PCT Filed: Aug. 5, 2011

(86) PCT No.: PCT/JP2011/004454
§ 371 (c)(1),
(2), (4) Date: Feb. 4, 2013

(87) PCT Pub. No.: WO2012/017677
PCT Pub. Date: Feb. 9, 2012

(65) Prior Publication Data
US 2013/0140488 A1 Jun. 6, 2013

(30) Foreign Application Priority Data

Aug. 5, 2010 (JP) ................................. 2010-176784

(51) Int. Cl.
*H01M 4/133* (2010.01)
*H01B 1/04* (2006.01)
*H01M 4/36* (2006.01)
*H01M 4/587* (2010.01)
*H01M 10/0525* (2010.01)

(52) U.S. Cl.
CPC .............. *H01M 4/133* (2013.01); *H01M 4/364* (2013.01); *H01M 4/587* (2013.01); *H01M 10/0525* (2013.01); *H01B 1/04* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 5,340,670 | A | * | 8/1994 | Takami et al. ................ 429/331 |
| 8,790,824 | B2 | * | 7/2014 | Sotowa et al. ................ 429/209 |
| 2004/0023115 | A1 | | 2/2004 | Kato et al. |
| 2004/0229125 | A1 | * | 11/2004 | Zou et al. ................... 429/231.8 |
| 2008/0286654 | A1 | | 11/2008 | Sawa et al. |
| 2012/0021294 | A1 | * | 1/2012 | Zhamu et al. .............. 429/231.8 |
| 2012/0045642 | A1 | * | 2/2012 | Nishimura et al. ........... 428/367 |

FOREIGN PATENT DOCUMENTS

| | | |
|---|---|---|
| JP | 2008-311209 A | 12/2008 |
| JP | 2009-117257 A | 5/2009 |
| JP | 2010-165580 A | 7/2010 |
| JP | 4738553 B2 | 8/2011 |
| WO | 2011/049199 A1 | 4/2011 |

OTHER PUBLICATIONS

Translation of JP 2009-117257 dated May 2009.*
International Search Report for PCT/JP2011/004454 dated Nov. 22, 2011.

* cited by examiner

*Primary Examiner* — Tanisha Diggs
(74) *Attorney, Agent, or Firm* — Sughrue Mion, PLLC

(57) ABSTRACT

An anode active material for use in a lithium secondary battery including a mixture of graphite I that has, according to X-ray powder diffraction, $d_{002}$ of not smaller than 0.3354 nm and not greater than 0.337 nm, Lc(004) of smaller than 100 nm, La(110) of not smaller than 100 nm, and a half width of the peak of a plane (101) at a diffraction angle (2θ) of 44 degrees to 45 degrees of not smaller than 0.65 degree and another graphite so as to have, according to X-ray powder diffraction, $d_{002}$ of not smaller than 0.3354 nm and not greater than 0.337 nm, Lc(004) of not smaller than 80 nm, La(110) of not smaller than 100 nm, and a half width of the peak of a plane (101) at a diffraction angle (2θ) of 44 degrees to 45 degrees of not smaller than 0.5 degree.

17 Claims, 1 Drawing Sheet

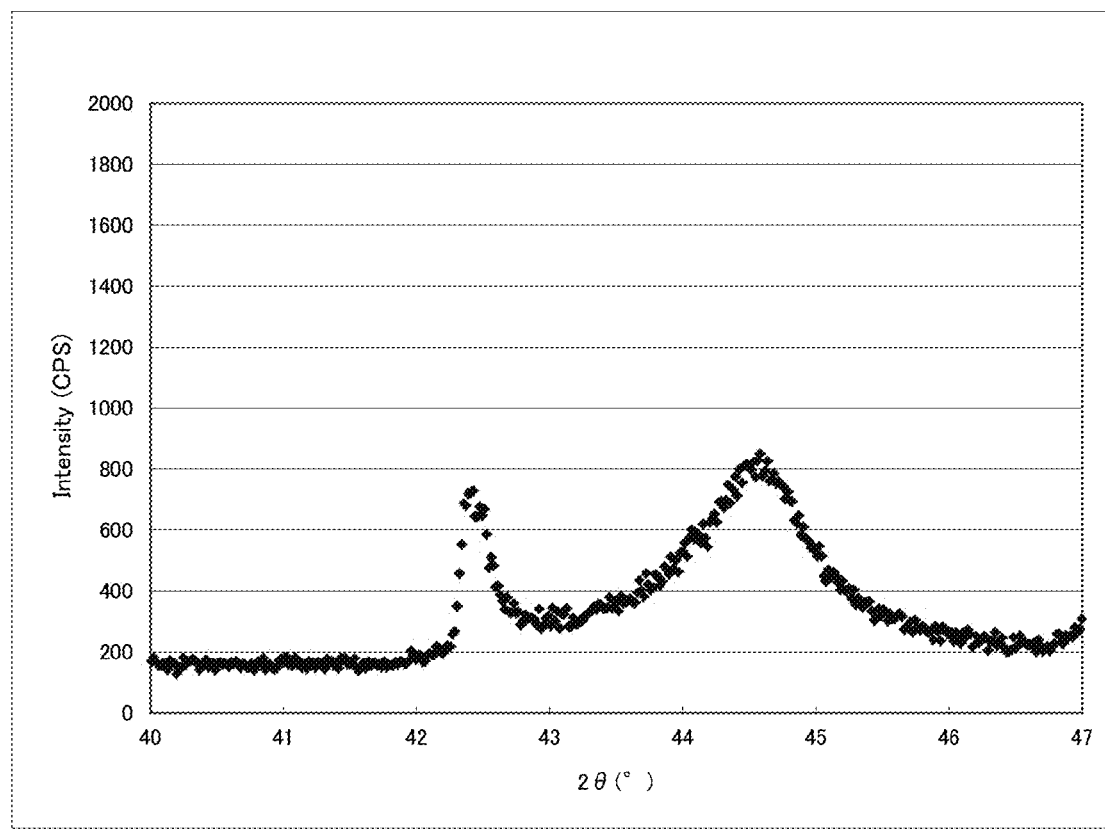

ANODE ACTIVE MATERIAL FOR USE IN LITHIUM SECONDARY BATTERY

CROSS REFERENCE TO RELATED APPLICATIONS

This application is a National Stage of International Application No. PCT/JP2011/004454 filed Aug. 5,2011, claiming priority based on Japanese Patent Application No. 2010-176784 filed Aug. 5,2010, the contents of all of which are incorporated herein by reference in their entirety.

TECHNICAL FIELD

The present invention relates to an anode active material for use in a lithium secondary battery, an anode for use in a lithium secondary battery, and a lithium secondary battery. More specifically, the present invention relates to an anode active material for use in a lithium secondary battery that maintains excellent charge-discharge cycle characteristics even when highly packed for increasing capacitance, an anode for use in a lithium secondary battery comprising the anode active material for use in a lithium secondary battery, and a lithium secondary battery comprising the anode for use in a lithium secondary battery. The lithium secondary battery in one embodiment of the present invention includes a lithium-ion capacitor.

BACKGROUND ART

Lithium secondary batteries are largely used as power supplies in portable devices and the like. Diversification in the functions of portable devices and the like has led to the growth in power consumption. This has been prompting demands for an increase in the capacitance and improvement in the charge-discharge cycle characteristics of lithium secondary batteries. In a lithium secondary battery, usually, a lithium salt such as lithium cobaltate serves as a cathode active material and graphite and/or the like serve as an anode active material.

Capacitance can be increased by enhancing the electrode packing density of a carbonaceous material used in an anode. When an electrode packing density is enhanced using a conventional carbonaceous material, however, deformation and/or the like of the carbonaceous material may occur to lead to significant degradation of charge-discharge cycle characteristics.

Because of this, studies are conducted to improve a carbonaceous material itself for use in an anode so as to increase capacitance and improve charge-discharge cycle characteristics. For example, Patent Document 1 and Patent Document 2 describe composite graphite having a particular crystal structure. Patent Document 3 describes combined use of graphite having a particular crystal structure and a vapor grown carbon fiber having a particular crystal structure. Patent Document 4 describes a carbon composite material that is obtained by adhering an organic compound serving as a polymer raw material to carbonaceous particles such as graphite particles, polymerizing the organic compound, and then heating it at 1800 to 3300 deg C.

Patent Document 1: JP 2007-141677 A
Patent Document 2: WO 2007/072858 A
Patent Document 3: JP 2007-42620 A
Patent Document 4: JP 2005-158718 A

SUMMARY OF THE INVENTION

Problems to be Resolved by the Invention

The carbonaceous materials disclosed in these Patent Documents have improved the capacitance and the charge-discharge cycle characteristics of a lithium secondary battery. However, as requirements on the performance of a lithium secondary battery grow year after year, further improvement is desired in a carbonaceous material for use in an anode for use in a lithium secondary battery.

A object of the present invention is to provide an anode active material for use in a lithium secondary battery that has large capacitance and maintains excellent charge-discharge cycle characteristics even when highly packed, an anode for use in a lithium secondary battery comprising the anode active material, and a lithium secondary battery comprising the anode.

Means for Solving the Problems

The present inventors have conducted intensive research to achieve these objects and, as a result, found a novel anode active material for use in a lithium secondary battery that comprises a mixture of two or more species of graphite so as to make the numerical values of the interplanar spacing, the crystallite size, and the half width of the diffraction peak, measured by X-ray diffraction, fall within particular ranges. The present inventors also found that a lithium secondary battery that comprises the anode active material in the anode has large capacitance and maintains excellent charge-discharge cycle characteristics even when highly packed with the anode active material. The present inventors have conducted further studies based on these findings and have now completed the present invention.

Thus, the present invention includes the following embodiments.

[1] an anode active material for use in a lithium secondary battery which comprises a mixture of two or more species of graphite, in which the mixture can be, according to X-ray powder diffraction, not smaller than 0.3354 nm and not greater than 0.337 nm in $d_{002}$,
not smaller than 80 nm in Lc(004),
not smaller than 100 nm in La(110), and
not smaller than 0.5 degree in a half width of the peak of a plane (101) at a diffraction angle ($2\theta$) of 44 degrees to 45 degrees.

[2] the anode active material for use in a lithium secondary battery according to [1] in which the ratio I(100)/I(101) of peak intensity in X-ray powder diffraction can be not lower than 0.6 and not higher than 1.

[3] the anode active material for use in a lithium secondary battery according to [1] or [2] in which a layer can have a ratio I(110)/I(004) of peak intensity of not lower than 0.1 measured by X-ray diffraction, the layer having density of not lower than 1.5 g/cm$^3$ and not higher than 1.6 g/cm$^3$ formed by applying a mixture of the anode active material and a binder to copper foil to be subjected to drying and pressure molding.

[4] the anode active material for use in a lithium secondary battery according to any one of [1] to [3] in which a BET specific surface area can be not greater than 5 m$^2$/g and $D_{50}$ referring to a volume average particle diameter can be not smaller than 3 μm and not greater than 30 μm.

[5] the anode active material for use in a lithium secondary battery according to any one of [1] to [4] in which one of the graphite species is graphite I in which the graphite I can be, according to X-ray powder diffraction,
not smaller than 0.3354 nm and not greater than 0.337 nm in $d_{002}$,
smaller than 100 nm in Lc(004),
not smaller than 100 nm in La(110), and not smaller than 0.65 degree in a half width of the peak of a plane (101) at a diffraction angle (2θ) of 44 degrees to 45 degrees.

[6] the anode active material for use in a lithium secondary battery according to [5] in which the graphite I can have a ratio I(100)/I(101) of peak intensity in X-ray powder diffraction of not lower than 0.7 and not higher than 1.

[7] the anode active material for use in a lithium secondary battery according to [5] or [6] in which a layer can have a ratio I(110)/I(004) of peak intensity of not lower than 0.2 measured by X-ray diffraction, the layer having density of not lower than 1.5 g/cm$^3$ and not higher than 1.6 g/cm$^3$ formed by applying a mixture of the graphite I and a binder to copper foil to be subjected to drying and pressure molding.

[8] the anode active material for use in a lithium secondary battery according to any one of [5] to [7] in which the graphite I can have a BET specific surface area of not greater than 5 m$^2$/g and $D_{50}$ referring to a volume average particle diameter of not smaller than 3 μm and not greater than 30 μm.

[9] the anode active material for use in a lithium secondary battery according to any one of [5] to [8] in which the content of the graphite I can be not less than 40% by mass and not more than 90% by mass.

[10] the anode active material for use in a lithium secondary battery according to any one of [1] to [9] in which one of the graphite species is graphite II in which the graphite II can be, according to X-ray powder diffraction,
not smaller than 0.3354 nm and not greater than 0.337 nm in $d_{002}$,
not smaller than 100 nm in Lc(004),
not smaller than 100 nm in La(110), and
not greater than 0.65 degree in a half width of the peak of a plane (101) at a diffraction angle (2θ) of 44 degrees to 45 degrees.

[11] the anode active material for use in a lithium secondary battery according to [10] in which the graphite II can be surface-treated with pitch having a softening point of 200 to 350 deg C. and a fixed carbon content of 50 to 80% by mass.

[12] the anode active material for use in a lithium secondary battery according to [11] in which the $D_{50}$ referring to the volume average particle diameter of the pitch can be 1 μm to 10 μm.

[13] the anode active material for use in a lithium secondary battery according to [11] or [12] in which the pitch can be optically isotropic.

[14] the anode active material for use in a lithium secondary battery according to any one of [10] to [13] in which the graphite II can be natural graphite that is processed into a sphere.

[15] the anode active material for use in a lithium secondary battery according to any one of [10] to [13] in which the graphite II can be artificial graphite made from mesophase pitch as a raw material.

[16] the anode active material for use in a lithium secondary battery according to any one of [10] to [15] in which the content of the graphite II can be not less than 10% by mass and not more than 60% by mass.

[17] an anode for use in a lithium secondary battery which comprises the anode active material for use in a lithium secondary battery according to any one of [1] to [16].

[18] the anode for use in a lithium secondary battery according to [17] which further comprises a vapor grown carbon fiber with a fiber diameter of not smaller than 5 nm and not larger than 0.2 μm.

[19] a lithium secondary battery which comprises the anode for use in a lithium secondary battery according to [17] or [18].

[20] a transportation which comprises the lithium secondary battery according to [19].

[21] a power-generating system which comprises the lithium secondary battery according to [19], and

[22] an electrical or electronic equipment which comprises the lithium secondary battery according to [19].

Advantageous Effects of the Invention

A lithium secondary battery that comprises the anode active material for use in a lithium secondary battery of the present invention in the anode has large capacitance and maintains excellent charge-discharge cycle characteristics even when highly packed with the anode active material.

BRIEF DESCRIPTION OF THE DRAWINGS

FIG. 1 shows the X-ray powder diffraction of a carbon anode active material for use in a lithium secondary battery in one embodiment of the present invention that is obtained in Production Example 1.

EMBODIMENTS FOR CARRYING OUT THE INVENTION

1) Anode Active Material for Use in Lithium secondary battery

An anode active material for use in a lithium secondary battery in one embodiment of the present invention, according to X-ray powder diffraction, is not smaller than 0.3354 nm and not greater than 0.337 nm, and preferably not smaller than 0.3359 nm and not greater than 0.3368 nm in $d_{002}$. $d_{002}$ indicates the crystallinity of graphite.

$d_{002}$ is interplanar spacing calculated from the 002 diffraction peak of graphite powder and the Bragg equation $d=\lambda/\sin\theta c$.

The anode active material in one embodiment of the present invention, according to X-ray powder diffraction, is not smaller than 80 nm, and preferably not smaller than 90 nm in Lc(004). The anode active material in one embodiment of the present invention, according to X-ray powder diffraction, is not smaller than 100 nm in La(110).

Lc(004) is the thickness of a crystallite in a c-axis direction calculated from the 004 diffraction peak of graphite powder. La(110) is the width of a crystallite in an a-axis direction calculated from the 110 diffraction peak of graphite powder.

The anode active material in one embodiment of the present invention, according to X-ray powder diffraction, has $B_{101}$ referring to the half width of the peak of a plane (101) at a diffraction angle (2θ) of 44 degrees to 45 degrees of not smaller than 0.5 degree, preferably not smaller than 0.5 degree and not greater than 2 degrees, and more preferably not smaller than 0.5 degree and not greater than 1.5 degrees.

When the $B_{101}$ referring to the half width of the peak of a plane (101) is not smaller than 0.5 degree, the peak is relatively broad. A broad peak is assumed to indicate that the ABA-stacked structure of a graphite crystal is disordered. It is known that an ABA-stacked structure is transformed into an AAA-stacked structure when a lithium ion is inserted into a graphite layer. When the ABA-stacked structure is disordered, transformation of the stacked structure of graphite at the time of lithium ion insertion is speculated to occur at lower energy.

The anode active material in one embodiment of the present invention, according to X-ray powder diffraction, has the ratio I(100)/I(101) of the peak intensity of preferably not higher than 1, more preferably not lower than 0.3 and not higher than 1, further preferably not lower than 0.6 and not higher than 1, and particularly preferably not lower than 0.6 and not higher than 0.9.

In the anode active material in one embodiment of the present invention, a layer with density of not lower than 1.5 g/cm$^3$ and not higher than 1.6 g/cm$^3$ formed by applying a mixture of the anode active material and a binder to copper foil to be subjected to drying and pressure molding has a ratio I(110)/I(004) of the peak intensity that is preferably not lower than 0.1 and is more preferably not lower than 0.1 and not higher than 0.9 measured by X-ray diffraction. The ratio I(110)/I(004) of the peak intensity thus measured indicates the orientation of graphite powder. The greater the ratio I(110)/I(004) is, the lower the orientation is.

The BET specific surface area of the anode active material in one embodiment of the present invention is preferably not greater than 5 m$^2$/g and is more preferably 1 to 4.5 m$^2$/g. When the BET specific surface area is not greater than 5 m$^2$/g, an undesirable side reaction with an electrolyte solution is less prone to proceed and deterioration in charge-discharge cycle characteristics is less prone to proceed.

The $D_{50}$ referring to the volume average particle diameter of the anode active material in one embodiment of the present invention is preferably not smaller than 3 μm and not greater than 30 μm, is more preferably not smaller than 4 μm and not greater than 25 μm, and is further preferably not smaller than 4 μm and not greater than 20 μm. When the $D_{50}$ referring to the volume average particle diameter is within the range, the surface of an electrode is smooth and an undesirable side reaction with an electrolyte solution is less prone to proceed.

The anode active material in one embodiment of the present invention comprises a mixture of two or more species of graphite. The mixture may be any combination of any graphite provided that the characteristic values described above are achieved after mixing.

One of the graphite species to be mixed is preferably graphite I.

According to X-ray powder diffraction, the graphite I is not smaller than 0.3354 nm and not greater than 0.337 nm and preferably not smaller than 0.3359 nm and not greater than 0.3368 nm in $d_{002}$, is smaller than 100 nm and preferably not smaller than 40 nm and not greater than 85 nm in Lc(004), is not smaller than 100 nm in La(110), and is not smaller than 0.65 degree, preferably not smaller than 0.65 degree and not greater than 2 degrees, and more preferably not smaller than 0.7 degree and not greater than 1.5 degrees in $B_{101}$ referring to a half width of the peak of a plane (101) at a diffraction angle (2θ) of 44 degrees to 45 degrees.

According to X-ray powder diffraction, the graphite I has the ratio I(100)/I(101) of the peak intensity of preferably not higher than 1, more preferably not lower than 0.7 and not higher than 1, and further preferably not lower than 0.75 and not higher than 0.95.

In the graphite I, a layer with density of not lower than 1.5 g/cm$^3$ and not higher than 1.6 g/cm$^3$ formed by applying a mixture of the graphite I and a binder to copper foil to be subjected to drying and pressure molding has a ratio I(110)/I(004) of the peak intensity that is preferably not lower than 0.2 and is more preferably higher than 0.35 and not higher than 0.9 measured by X-ray diffraction.

The graphite I has the BET specific surface area of preferably not greater than 5 m$^2$/g and more preferably 1 to 4.5 m$^2$/g, and the $D_{50}$ referring to the volume average particle diameter of preferably not smaller than 3 μm and not greater than 30 μm, more preferably not smaller than 4 μm and not greater than 25 μm, and further preferably not smaller than 4 μm and not greater than 20 μm.

The graphite I can be obtained, for example, by the following method.

First, crude oil of Venezuelan origin is distilled under reduced pressure to obtain a residue. The residue has the API gravity of preferably 1 to 5, the asphaltene content of preferably 10 to 50%, the resin content of preferably 5 to 30%, and the sulfur content of preferably 1 to 12%.

The residue is coked to obtain coke. A coking method may be delayed coking or fluid coking. The resulting coke is cut out with water and is heated, followed by drying to achieve a water content of preferably not higher than 1.0%.

The dried coke lump is pulverized and is classified to obtain a carbon powder. A pulverizing method is not particularly limited, and examples thereof include a method using an apparatus such as a hammer mill, a pin mill, a jet mill, a rod mill, and an ACM pulverizer. The $D_{50}$ referring to the volume average particle diameter of the carbon powder after classification is preferably not smaller than 3 μm and not greater than 30 μm, is more preferably not smaller than 4 μm and not greater than 25 μm, and is further preferably not smaller than 4 μm and not greater than 20 μm.

The carbon powder is heated preferably at 1000 to 3500 deg C., more preferably at 2000 to 3400 deg C., and further preferably at 2500 to 3300 deg C. so as to be converted into graphite. Thus, the graphite I can be obtained.

The graphite I according to the present invention may be surface-treated. Examples of the surface treatment include surface fusion by mechanofusion or a similar method, surface coating by a wet process or a similar method, and the like.

The wet process is, for example, a method described in JP 2005-158718 A, and is specifically a method comprising adhering an organic compound serving as a polymer raw material to the surface of the graphite I and/or impregnating the surface of the graphite I with an organic compound serving as a polymer raw material, polymerizing the organic compound, and heating it at 1800 to 3300 deg C., or a method comprising adhering a solution of a resin material to the surface of the graphite I and/or impregnating the surface of the graphite I with a solution of a resin material, drying, and heating at 1800 to 3300 deg C.

Mechanofusion is, for example, a method comprising placing the graphite I and different species of carbon materials or resin materials in equipment for fast rotation mixing, applying mechanical energy to the graphite I and the different species of carbon materials or resin materials to cause a mechanochemical reaction, and, where appropriate, performing heating at 900 deg C. to 2000 deg C. In the present invention, surface treatment with mechanofusion is preferable.

In the surface treatment of the graphite I, a carbon material such as petroleum pitch, coal pitch, and coal tar and/or a resin material such as phenol resins and furan resins is (are) used. Petroleum pitch and coal pitch are optically isotropic or optically anisotropic. In Production Examples of the present specification, an optically isotropic one is used. The pitch used in the surface treatment has the softening point of preferably 200 to 350 deg C., the fixed carbon content of preferably 50 to 80% by mass, and the $D_{50}$ referring to the volume average particle diameter of preferably 1 μm to 10 μm. The amount of the pitch used in the surface treatment is preferably 0.1 to 50 parts by mass and is more preferably 0.1 to 10 parts by mass relative to 100 parts by mass of the graphite I.

The content of the graphite I in the anode active material is preferably not smaller than 40% by mass and not greater than 90% by mass, is more preferably not smaller than 50% by mass and not greater than 80% by mass, and is further preferably not smaller than 50% by mass and not greater than 70% by mass.

One of the graphite species to be mixed may be a conventionally known graphite. The known graphite is preferably graphite II.

The graphite II, according to X-ray powder diffraction, has $d_{002}$ of not smaller than 0.3354 nm and not greater than 0.337 nm and preferably not smaller than 0.3359 nm and not greater than 0.3368 nm, Lc(004) of not smaller than 100 nm, and La(110) of not smaller than 100 nm.

The graphite II, according to X-ray powder diffraction, has $B_{101}$ referring to a half width of the peak of a plane (101) at a diffraction angle (2θ) of 44 degrees to 45 degrees of not higher than 0.65 degree. The graphite II has high integrity in the ABA-stacked structure of a graphite crystal.

In the graphite II, a layer with density of not lower than 1.5 g/cm$^3$ and not higher than 1.6 g/cm$^3$ formed by applying a mixture of the graphite II and a binder to copper foil to be subjected to drying and pressure molding has a ratio I(110)/I(004) of the peak intensity that is preferably not higher than 0.4 and is more preferably not higher than 0.35 measured by X-ray diffraction. The graphite II is preferably higher in the orientation than the graphite I. The graphite II has BET specific surface area of preferably not greater than 5 m$^2$/g and more preferably 1 to 4.5 m$^2$/g, and $D_{50}$ referring to the volume average particle diameter is preferably not smaller than 3 μm and not greater than 30 μm, more preferably not smaller than 4 μm and not greater than 25 μm, and further preferably not smaller than 4 μm and not greater than 20 μm.

The graphite II is preferably natural graphite or artificial graphite. The natural graphite is preferably one that is processed into a sphere, and the artificial graphite is preferably one made from mesophase pitch as a raw material.

The graphite II may be surface-treated. Examples of a method of surface treatment include the same methods exemplified for the graphite I. In the present invention, surface treatment with mechanofusion is preferable. In the surface treatment of the graphite II, a carbon material such as petroleum pitch, coal pitch, and coal tar and/or a resin material such as phenol resins and furan resins is (are) used. Petroleum pitch and coal pitch are optically isotropic or optically anisotropic. In Production Examples of the present specification, an optically isotropic one is used. The pitch used in the surface treatment has the softening point of preferably 200 to 350 deg C., the fixed carbon content of preferably 50 to 80% by mass, and the $D_{50}$ referring to the volume average particle diameter of preferably 1 μm to 10 μm. The amount of the pitch used in the surface treatment is preferably 0.1 to 50 parts by mass and is more preferably 0.1 to 10 parts by mass relative to 100 parts by mass of the graphite II.

The content of the graphite II in the anode active material is preferably not smaller than 10% by mass and not greater than 60% by mass, is more preferably not smaller than 20% by mass and not greater than 50% by mass, and is further preferably not smaller than 30% by mass and not greater than 50% by mass.

2) Anode for Use in Lithium secondary battery

An anode for use in a lithium secondary battery in one embodiment of the present invention comprises the anode active material in one embodiment of the present invention.

In the anode for use in a lithium secondary battery, the anode active material is usually in an anode active material layer. The anode active material layer is formed, by various methods, of a mixture of the anode active material, a binder, and an additive that is compounded where appropriate. The anode active material layer usually has a collector stacked thereon for facilitating energization with a terminal, a conductive wire, and the like.

Examples of the binder include polyethylenes, polypropylenes, ethylene-propylene terpolymers, butadiene rubber, styrene-butadiene rubber, butyl rubber, polytetrafluoroethylene, poly(meth)acrylates, polyvinylidene fluoride, polyethylene oxide, poly(propylene oxide), polyepichlorohydrin, polyphosphazenes, polyacrylonitrile, and the like.

Examples of the additive that is compounded in the anode active material layer where appropriate include a conductive additive, an ion-permeable compound, a thickener, a dispersant, a lubricant, active carbon, and the like.

Examples of the conductive additive include conductive metal powders such as a silver powder; powders of conductive carbon such as furnace black, Ketjenblack, and acetylene black; a carbon nanotube, a carbon nanofiber, a vapor grown carbon fiber, and the like. The anode in one embodiment of the present invention preferably comprises a vapor grown carbon fiber as the additive. The fiber diameter of the vapor grown carbon fiber is preferably not smaller than 5 nm and not larger than 0.2 μm. The content of the vapor grown carbon fiber is preferably 0.1 to 10% by mass relative to the mass of the anode active material layer. Examples of the ion-permeable compound include polysaccharides such as chitin and chitosan, crosslinked products of the polysaccharides, and the like. Examples of the thickener include carboxymethylcellulose, polyvinyl alcohol, and the like.

The anode active material layer is obtained, for example, by applying the mixture in paste form to the collector, followed by drying and performing pressure molding, or by pressure molding of the mixture in granular form on the collector. The thickness of the anode active material layer is usually not smaller than 0.04 mm and not greater than 0.15 mm. The pressure to be applied at the time of formation can be adjusted so as to obtain an anode active material layer of any electrode density. The pressure to be applied at the time of formation is preferably about 1 t/cm$^2$ to 3 t/cm$^2$.

Examples of the collector include conductive metal foil, a conductive metal mesh, perforated plate of a conductive metal, and the like. The conductive metal used contains copper, aluminum, nickel, and/or the like. The collector used in the anode preferably contains copper.

3) Lithium Secondary Battery

A lithium secondary battery in one embodiment of the present invention comprises the anode for use in a lithium secondary battery in one embodiment of the present invention. The lithium secondary battery in one embodiment of the present invention includes a lithium-ion capacitor.

The lithium secondary battery in one embodiment of the present invention further comprises a cathode. As the cathode, one that is conventionally used in a lithium secondary battery can be used. The cathode usually comprises a cathode active material layer comprising a cathode active material and a collector stacked on the cathode active material layer. Examples of the cathode active material include $LiNiO_2$, $LiCoO_2$, $LiMn_2O_4$, and the like. The cathode active material layer may further comprise a conventionally known cathode active material additive. The collector used in the cathode preferably contains aluminum.

In the lithium secondary battery, the cathode and the anode are usually immersed in an electrolyte. The electrolyte may be liquid, gel, or solid.

Examples of the liquid electrolyte include a solution of a lithium salt in a nonaqueous solvent. Examples of the lithium salt include $LiClO_4$, $LiPF_6$, $LiAsF_6$, $LiBF_4$, $LiSO_3CF_3$, $CH_3SO_3Li$, $CF_3SO_3Li$, and the like. The nonaqueous solvent in the liquid electrolyte is preferably at least one selected from the group consisting of ethylene carbonate, diethyl carbonate, dimethyl carbonate, methylethyl carbonate, propylene carbonate, butylene carbonate, ganma-butyrolactone, and vinylene carbonate.

Examples of the solid electrolyte or the gel electrolyte include polymer electrolytes such as sulfonated styrene-olefin copolymers, polymer electrolytes comprising polyethylene oxide and $MgClO_4$, polymer electrolytes having a trimethylene oxide structure, and the like. The nonaqueous solvent in the polymer electrolytes is preferably at least one selected from the group consisting of ethylene carbonate, diethyl carbonate, dimethyl carbonate, methylethyl carbonate, propylene carbonate, butylene carbonate, ganma-butyrolactone, and vinylene carbonate.

A separator is provided, where appropriate, between the cathode and the anode. Examples of the separator include a nonwoven fabric, a woven fabric, a microporous film, and the like, and a combination thereof, etc.

The lithium secondary battery in one embodiment of the present invention has applications in various fields. Examples thereof include electrical and electronic equipment such as personal computers, tablet computers, laptop computers, cellular phones, radios, personal organizers, electronic dictionaries, PDAs (Personal Digital Assistants), electric meters, electronic keys, electronic tags, power storage devices, electric tools, toys, digital cameras, digital videos, AV systems, and vacuum cleaners; transportation such as electric vehicles, hybrid vehicles, electric motorcycles, hybrid motorcycles, electric bicycles, electric power-assisted bicycles, railcars, aircrafts, and ships; power-generating systems such as solar power systems, wind power systems, tidal power systems, and geothermal power systems; and the like.

EXAMPLES

The present invention is described more specifically by examples below. The scope of the present invention is, however, not limited to these examples.

The physical properties of an anode active material for use in a lithium secondary battery and graphite were measured by the following methods. "$d_{002}$, Lc(004), La(110), I(100)/I(101), and $B_{101}$"

The measurement was performed by X-ray powder diffraction. $d_{002}$ is interplanar spacing calculated from a 002 diffraction peak and the Bragg equation $d=\lambda/\sin\theta c$. Lc(004) is the thickness of a crystallite in a c-axis direction calculated using a 004 diffraction peak. La(110) is the width of a crystallite in an a-axis direction calculated using a 110 diffraction peak. I(100)/I(101) is the ratio of the peak intensity of a 100 diffraction peak to the peak intensity of a 101 diffraction peak. $B_{101}$ is the half width of the 101 diffraction peak at a diffraction angle (2θ) of 44 degrees to 45 degrees. "Orientation, I(110)/I(004)"

Polyvinylidene fluoride (L#9130; n-methyl-2-pyrrolidone solution) manufactured by KUREHA CORPORATION was added to an anode active material or graphite by a small amount at a time while kneading to achieve a solid content of 5% by mass. N-methyl-2-pyrrolidone was added thereto, and the resultant was kneaded to achieve adequate fluidity. Kneading was performed at 500 rpm for 5 minutes with an NBK-1, which is a defoaming kneader manufactured by Nissei Corp., to obtain the mixture in paste form. The mixture was applied to copper foil using an automatic coater and a doctor blade with a clearance of 250 μm.

The copper foil to which the mixture was applied was placed on a hot plate at about 80 deg C. to get rid of water. Drying was then performed in a vacuum dryer at 120 deg C. for 6 hours. After drying, pressure molding was performed with a press machine so as to achieve an electrode density that is calculated from the mass of the solid content in the mixture and the dry volume of the coating of not lower than 1.5 $g/cm^3$ and not higher than 1.6 $g/cm^3$, thereby obtaining an electrode sheet composed of stacked layers of the mixture and the copper foil. The electrode sheet was cut out into an appropriate size and was affixed to a glass cell for X-ray diffraction measurement, followed by X-ray diffraction measurement. The ratio I(110)/I(004) of peak intensity was then calculated, which indicates the orientation of graphite.

"BET Specific Surface Area, $S_{sa}$"

Specific surface area was calculated from the analysis through the use of the BET method using nitrogen adsorption. "Volume Average Particle Diameter, $D_{50}$"

Two microspatulafuls of graphite and two drops of a nonionic surfactant (Triton-X) were added to 50 ml of water, followed by ultrasonic dispersion for 3 minutes. The dispersion was placed in a laser diffraction particle size analyzer (Mastersizer) manufactured by Malvern Instruments Ltd. so as to measure particle size distribution, thereby determining $D_{50}$ referring to a volume average particle diameter.

Production Example 1

Production of graphite A1

Crude oil of Venezuelan origin was distilled under reduced pressure to obtain a residue. The residue had API gravity of 2.3, an asphaltene content of 25%, a resin content of 15%, and a sulfur content of 6.0%. The residue was placed in a delayed coker for coking to obtain coke. The resulting coke was cut out with water and was heated at 120 deg C., followed by drying to achieve a water content of not higher than 1.0%.

The dried coke lump was pulverized with a hammer mill manufactured by Hosokawa Micron Corporation, followed by air classification by a Turbo Classifier, TC-15N manufactured by Nisshin Engineering Inc., to obtain a carbon powder having $D_{50}$ referring to a volume average particle diameter of 17 μm.

The carbon powder was packed into a graphite crucible, followed by heating in an Acheson furnace at 3200 deg C. to obtain graphite A1. The physical properties are shown in Table 1. The X-ray powder diffraction of the graphite A1 is shown in FIG. 1.

Production Example 2 to Production Example 4

Spherical natural graphite (hereinafter, referred to as graphite C1), mesophase carbon (hereinafter, referred to as graphite D), and scale-like artificial graphite (hereinafter, referred to as graphite E), all of which were commercially available products, were prepared.

Production Example 5

Production of Graphite C2

Five parts by mass of optically isotropic petroleum pitch having a softening point of about 275 deg C., a fixed carbon content of 65% by mass, and $D_{50}$ referring to a volume average particle diameter of 5 μm was mixed with 95 parts by mass of the graphite C1. The mixture was placed in a mechanofusion system manufactured by Hosokawa Micron Corporation and was subjected to a fast rotation. The resultant was heated at 1200 deg C. for 1 hour in a nitrogen gas atmosphere. After cooling, the resultant was passed through a sieve with an aperture of 45 μm to obtain graphite C2. Mechanofusion is a technique of applying mechanical energy to particles of a plurality of different materials to cause a mechanochemical reaction so as to create a new material. The physical properties are shown in Table 1.

with a press machine so as to achieve an electrode density that is calculated from the mass of the solid content in the mixture and the dry volume of the coating of about 3.5 g/cm$^3$, thereby obtaining a cathode. As an anode, an electrode sheet fabricated in evaluation of orientation was used.

In an SUS304 cylindrical container, a spacer, a leaf spring, the anode, a separator (polypropylene microporous film "Celgard 2400" manufactured by Celgard Corporation), and the

TABLE 1

| | Graphite* | $d_{002}$ (nm) | Crystal structure Lc(004) (nm) | La(110) (nm) | $B_{101}$ (degree) | I(100)/I(101) | Orientation I(110)/I(004) | $S_{sa}$ (m$^2$/g) | $D_{50}$ (μm) |
|---|---|---|---|---|---|---|---|---|---|
| Production Example 1 | A1 | 0.3360 | 80 | >100 | 1.0 | 0.85 | 0.75 | 1.5 | 17 |
| Production Example 2 | C1 | 0.3354 | >100 | >100 | 0.4 | 0.37 | 0.09 | 5.6 | 22 |
| Production Example 3 | D | 0.3363 | 90 | >100 | 0.6 | 0.61 | 0.35 | 0.9 | 22 |
| Production Example 4 | E | 0.3354 | >100 | >100 | 0.2 | 0.54 | 0.001 | 4.5 | 24 |
| Production Example 5 | C2 | 0.3355 | >100 | >100 | 0.4 | 0.37 | 0.12 | 4.4 | 20 |

*C1 is spherical natural graphite, C2 is a surface-treated product of the spherical natural graphite, D is mesophase carbon, and E is scale-like artificial graphite. A1 is graphite produced in Production Example 1.

TABLE 2

| | Anode active material | $d_{002}$ (nm) | Crystal structure Lc(004) (nm) | La(110) (nm) | $B_{101}$ (degree) | I(100)/I(101) | Orientation I(110)/I(004) | $S_{sa}$ (m$^2$/g) | $D_{50}$ (μm) |
|---|---|---|---|---|---|---|---|---|---|
| Ex. 1 | Graphite A1: 60 wt % + Graphite C1: 40 wt % | 0.3358 | >100 | >100 | 0.60 | 0.61 | 0.20 | 3.1 | 19 |
| Ex. 2 | Graphite A1: 60 wt % + Graphite C2: 40 wt % | 0.3359 | >100 | >100 | 0.60 | 0.60 | 0.31 | 2.7 | 18 |
| Ex. 3 | Graphite A1: 60 wt % + Graphite D: 40 wt % | 0.3363 | 90 | >100 | 0.70 | 0.70 | 0.45 | 1.2 | 19 |
| Ex. 4 | Graphite A1: 60 wt % + Graphite E: 40 wt % | 0.3357 | >100 | >100 | 0.50 | 0.68 | 0.15 | 2.7 | 19 |
| Comp. Ex. 1 | Graphite A1: 40 wt % + Graphite C1: 60 wt % | 0.3358 | >100 | >100 | 0.40 | 0.50 | 0.17 | 4.0 | 19 |
| Comp. Ex. 2 | Graphite A1: 40 wt % + Graphite E: 60 wt % | 0.3356 | >100 | >100 | 0.35 | 0.57 | 0.10 | 3.5 | 19 |

Examples 1 to 4 and Comparative Examples 1 and 2

The graphite prepared in Production Examples 1 to 5 was mixed according to the recipe shown in Table 2 to obtain an anode active material. The physical properties of the anode active material are shown in Table 2.

A lithium secondary battery was produced using the anode active material by the following method, followed by measurement of discharge capacitance retention (%) after 200th cycle. The results are shown in Table 3.

"Production of Lithium Secondary Battery"

The following process was carried out in a glove box maintained in a dry argon gas atmosphere with a dew point of not higher than −80 deg C.

N-methyl-2-pyrrolidone was added to 95 parts by mass of lithium cobaltate (C-10, cathode active material manufactured by Nippon Chemical Industrial Co., Ltd.), 3 parts by mass of a binder (polyvinylidene fluoride: PVDF), and 5 parts by mass of a conductive material (acetylene black) to obtain a mixture in slurry form. The mixture was applied to aluminum foil of 25-μm thick. The aluminum foil to which the mixture was applied was dried in a vacuum dryer at 120 deg C. for 6 hours. After drying, pressure molding was performed cathode were stacked in this order. An SUS304 cylindrical top cover was placed thereon. The container and the top cover were crimped together with a coin cell crimper to obtain a coin cell for evaluation. Five coin cells were fabricated for each anode active material to be subjected to an evaluation test.

"Discharge Capacitance Retention (%) after 200th Cycle"

The coin cells were subjected to the following charge-discharge test at constant current and constant voltage.

The 1st and 2nd cycles were conducted as follows. Charging was performed at constant current of 0.17 mA/cm$^2$ starting at resting potential to 4.2 V, and from the point when 4.2 V was reached, charging was performed at constant voltage of 4.2 V. Charging was then paused when the current value decreased to 25.4 μA. Discharging was performed at constant current of 0.17 mA/cm$^2$, followed by cutting off at voltage of 2.7 V.

The 3rd and later cycles were conducted as follows.

Charging was performed at constant current of 0.34 mA/cm$^2$ (equivalent to 0.2 C) starting at resting potential to 4.2 V, and from the point when 4.2 V was reached, charging was performed at constant voltage of 4.2 V. Charging was then paused when the current value decreased to 20 μA.

Discharging was performed at constant current of 1.7 mA/cm² (equivalent to 1.0 C), followed by cutting off at voltage of 2.7 V.

The proportion of the discharge capacitance after 200th cycle to the discharge capacitance after 3rd cycle was determined. This was performed for the five coin cells, and the average value was determined to serve as "discharge capacitance retention (%) after 200th cycle".

TABLE 3

|  | Anode active material | Discharge capacitance retention (%) after 200th cycle |
|---|---|---|
| Ex. 1 | Graphite A1; 60 wt % + Graphite C1: 40 wt % | 83 |
| Ex. 2 | Graphite A1: 60 wt % + Graphite C2: 40 wt % | 80 |
| Ex. 3 | Graphite A1: 60 wt % + Graphite D: 40 wt % | 80 |
| Ex. 4 | Graphite A1: 60 wt % + Graphite E: 40 wt % | 83 |
| Comp. Ex. 1 | Graphite A1: 40 wt % + Graphite C1: 60 wt % | 65 |
| Comp. Ex. 2 | Graphite A1: 40 wt % + Graphite E: 60 wt % | 55 |

As shown in Table 3, the anode active material for use in a lithium secondary battery in one embodiment of the present invention was found to give a lithium secondary battery with excellent charge-discharge cycle characteristics.

The invention claimed is:

1. An anode active material for use in a lithium secondary battery which comprises a mixture of two or more species of graphite, in which the mixture is, according to X-ray powder diffraction, not smaller than 0.3354 nm and not greater than 0.337 nm in $d_{002}$, not smaller than 80 nm in Lc(004), not smaller than 100 nm in La(110), and not smaller than 0.5 degree in a half width of the peak of a plane (101) at a diffraction angle (2θ) of 44 degrees to 45 degrees, wherein one of the graphite species constituting the mixture of two or more species of graphite is graphite I in which the graphite I is, according to X-ray powder diffraction, not smaller than 0.3354 nm and not greater than 0.337 nm in $d_{002}$, smaller than 100 nm in Lc(004), not smaller than 100 nm in La(110), and not smaller than 0.65 degree in a half width of the peak of a plane (101) at a diffraction angle (2θ) of 44 degrees to 45 degrees, and wherein one of the graphite species is graphite II in which the graphite II is, according to X-ray powder diffraction, not smaller than 0.3354 nm and not greater than 0.337 nm in $d_{002}$, not smaller than 100 nm in Lc(004), not smaller than 100 nm in La(110), and not greater than 0.65 degree in a half width of the peak of a plane (101) at a diffraction angle (2θ) of 44 degrees to 45 degrees.

2. The anode active material for use in a lithium secondary battery according to claim 1 wherein the anode active material has a ratio I(100)/I(101) of peak intensity in X-ray powder diffraction that is not lower than 0.6 and not higher than 1.

3. The anode active material for use in a lithium secondary battery according to claim 1 wherein a layer comprising the anode active material has a ratio I(110)/I(004) of peak intensity of not lower than 0.1 measured by X-ray diffraction, the layer having density of not lower than 1.5 g/cm³ and not higher than 1.6 g/cm³ formed by applying a mixture of the anode active material and a binder to copper foil to be subjected to drying and pressure molding.

4. The anode active material for use in a lithium secondary battery according to claim 1 wherein the anode active material has a BET specific surface area that is not greater than 5 m²/g and $D_{50}$ referring to a volume average particle diameter is not smaller than 3 μm and not greater than 30 μm.

5. The anode active material for use in a lithium secondary battery according to claim 1 wherein the graphite I has a ratio I(100)/I(101) of peak intensity in X-ray powder diffraction of not lower than 0.7 and not higher than 1.

6. The anode active material for use in a lithium secondary battery according to claim 1 wherein the graphite I has a BET specific surface area of not greater than 5 m²/g and $D_{50}$ referring to a volume average particle diameter of not smaller than 3 μm and not greater than 30 μm.

7. The anode active material for use in a lithium secondary battery according to claim 1 wherein the content of the graphite I in the anode active material is not less than 40% by mass and not more than 90% by mass.

8. The anode active material for use in a lithium secondary battery according to claim 1 wherein the graphite II is surface-treated with pitch having a softening point of 200 to 350 deg C and a fixed carbon content of 50 to 80% by mass.

9. The anode active material for use in a lithium secondary battery according to claim 8 wherein $D_{50}$ referring to a volume average particle diameter of the pitch is 1 μm to 10 μm.

10. The anode active material for use in a lithium secondary battery according to claim 8 wherein the pitch is optically isotropic.

11. The anode active material for use in a lithium secondary battery according to claim 1 wherein the graphite II is natural graphite that is processed into a sphere.

12. The anode active material for use in a lithium secondary battery according to claim 1 wherein the graphite II is artificial graphite made from mesophase pitch as a raw material.

13. The anode active material for use in a lithium secondary battery according to claim 1 wherein the content of the graphite II in the anode active material is not less than 10% by mass and not more than 60% by mass.

14. An anode for use in a lithium secondary battery comprising the anode active material for use in a lithium secondary battery according to claim 1.

15. The anode for use in a lithium secondary battery according to claim 14 further comprising a vapor grown carbon fiber with a fiber diameter of not smaller than 5 nm and not larger than 0.2 μm.

16. A lithium secondary battery comprising the anode for use in a lithium secondary battery according to claim 14.

17. A transportation, a power-generating system, or an electrical or electronic equipment comprising the lithium secondary battery according to claim 16.

* * * * *